US007325464B2

(12) United States Patent
Backlund

(10) Patent No.: US 7,325,464 B2
(45) Date of Patent: Feb. 5, 2008

(54) METHOD AND A DEVICE FOR MEASURING STRESS FORCES IN REFINERS

(75) Inventor: Hans-Olof Backlund, Kovland (SE)

(73) Assignee: Metso Paper, Inc. (FI)

(*) Notice: Subject to any disclaimer, the term of this patent is extended or adjusted under 35 U.S.C. 154(b) by 164 days.

(21) Appl. No.: 10/509,960

(22) PCT Filed: Apr. 2, 2003

(86) PCT No.: PCT/SE03/00531

§ 371 (c)(1),
(2), (4) Date: Jul. 29, 2005

(87) PCT Pub. No.: WO03/082471

PCT Pub. Date: Oct. 9, 2003

(65) Prior Publication Data

US 2005/0268727 A1 Dec. 8, 2005

(30) Foreign Application Priority Data

Apr. 2, 2002 (SE) .................................... 0201023

(51) Int. Cl.
*G01L 1/26* (2006.01)
*G01L 5/04* (2006.01)

(52) U.S. Cl. ................................................ 73/862.391

(58) Field of Classification Search ................. 73/818, 73/829, 862.391
See application file for complete search history.

(56) References Cited

U.S. PATENT DOCUMENTS

| | | | | |
|---|---|---|---|---|
| 6,587,803 | B2 * | 7/2003 | Johansson | 702/104 |
| 6,840,470 | B2 * | 1/2005 | Bankes et al. | 241/30 |
| 6,892,973 | B2 * | 5/2005 | Johansson et al. | 241/261.2 |
| 6,915,711 | B1 * | 7/2005 | Backlund et al. | 73/862.391 |
| 7,010,988 | B2 * | 3/2006 | Backlund et al. | 73/829 |

FOREIGN PATENT DOCUMENTS

SE 514 841 A 4/2001

* cited by examiner

*Primary Examiner*—Edward Lefkowitz
*Assistant Examiner*—Octavia Davis
(74) *Attorney, Agent, or Firm*—Lerner, David, Littenberg, Krumholz & Mentlik, LLP

(57) ABSTRACT

A method and apparatus for measuring stress forces in refiners is disclosed. In the method, a measuring surface which is a portion of at least one refining surface containing at least a portion of the bars extending across that surface is resiliently mounted in the refining surface, and the stress forces are measured perpendicular to the measuring surface.

15 Claims, 3 Drawing Sheets

METHOD AND A DEVICE FOR MEASURING STRESS FORCES IN REFINERS

FIELD OF THE INVENTION

The present invention relates to a method and a measuring device for measuring stress forces in refiners having refining discs that between them define a refining gap for refining material.

BACKGROUND OF THE INVENTION

Refiners are used for refining fibrous material. The refiner generally comprises refining members in the form of discs rotating in relation to each other and between which refining material passes from the inner periphery of the refining members where it is supplied, to the outer periphery of the refining members through a refining gap formed between the refining members. The refining material is then extracted at the outer periphery. One of the refining discs is often stationary while the other rotates. The refining discs are generally composed of segments provided with bars. The inner segments have a coarser pattern and the outer segments have a finer pattern in order to achieve fine refining of the refining material.

To obtain high quality refining material when refining fibrous material, the disturbances in operating conditions that, for various reasons, constantly occur must be corrected by constant adjustment of the various refining parameters to optimal values. This can be achieved, for instance, by altering the supply of water to produce a greater or lesser cooling effect, by altering the flow of refining material or adjusting the distance between the refining members, or a combination of these measures. To enable the necessary adjustments and corrections to be made, an accurate determination of the energy transmitted to the refining material is required, as well as of the distribution of the energy transmitted over the surface of the refining members.

To determine the energy/power transmitted to the refining material it is known to endeavour to measure the shearing forces that occur in the refining zone. What is known as a shearing force occurs when two surfaces move in relation to each other with a viscous liquid between the surfaces. Such shearing force is also created in a refiner when refining wood chips mixed with water. It can be imagined that the wood chips are both sheared and rolled between the refining discs, as well as collisions occurring between chips and bars. The shearing force depends, for instance, on the force bringing the discs together and on the friction coefficient. The normal force acting on the surface also varies with the radius.

In International Application No. WO 00/78458, a method and a measuring device are known for measuring stress forces in such refiners, the device comprising a force sensor that measures the stress force over a measuring surface constituting a part of a refining disc, and in which the measuring surface comprises at least parts of more than one bar and is resiliently arranged in the surface of the refining disc. However, it has been found that this measuring device is very sensitive to temperature fluctuations, which are usual in the applications under discussion, and it therefore often gives incorrect values for the force, which cannot be used to control the refining process, for instance. Furthermore, a value is obtained only for the shearing force, in one direction. A method and a measuring device for measuring stress forces in such refiners are also known, as set forth in International Application No. PCT/SE02/01501. A solution is proposed therein to the problem of sensitivity to temperature fluctuations, as well as measurement of the shearing force in two directions.

However, neither of these publications proposes any solution to the drawback of other forces influencing the refining segments, such as the normal forces, not being taken into consideration.

One object of the present invention is to solve the problems mentioned above and thus provide a method and a measuring device that enables a more complete and correct result than previously known devices, and that provides more information concerning the actual refining process.

SUMMARY OF THE INVENTION

In accordance with the present invention, these and other objects have now been realized by the discovery of a method of measuring stress forces in refiners including a pair of refining discs juxtaposed with each other and forming a refining gap for refining material therebetween, the pair of refining discs including at least one refining surface including a plurality of bars for refining the material within the refining gap, the at least one refining surface including a measuring surface comprising a predetermined portion of the at least one refining surface including at least a portion of at least a pair of the plurality of bars, the method comprising resiliently mounting the measuring surface in the at least one refining surface and measuring the stress forces directed perpendicular to the measuring surface. Preferably, the measuring comprises measuring both the perpendicular forces comprising the force exerted by steam pressure at the measuring surface and the force exerted by fiber pressure from the refining material. In another embodiment, the measuring comprises measuring only the force exerted perpendicular to the measuring surface by the fiber pressure from the refining material and the method includes compensating for the force exerted by steam pressure at the measuring surface. In a preferred embodiment, the compensating for the force exerted by steam pressure at the measuring surface comprises measuring the temperature of the steam at the measuring surface and calculating the force exerted by the steam pressure at the measuring surface based on the measured steam temperature.

In accordance with one embodiment of the method of the present invention, the measuring comprises disposing force sensors in connection with the measuring surface and permitting the steam pressure to influence the force sensors in both the direction of the measuring surface and the opposite direction to thereby compensate for the steam pressure.

In accordance with the present invention, apparatus has also been discovered for measuring stress forces in refiners including a pair of refining discs juxtaposed with each other and forming a refining gap for refining material therebetween, the pair of refining discs including at least one refining surface including a plurality of bars for refining the material within the refining gap, stress measuring means for measuring the stress force over a measuring surface comprising a predetermined portion of the at least one refining surface comprising at least a portion of at least a pair of the plurality of bars, the stress measuring means being resiliently mounted in the at least one refining surface, and including stress measuring members for measuring the forces directed perpendicular to the measuring surface. Preferably, the stress measuring means is removably disposed in the at least one refining surface perpendicular to the measuring surface and the stress measuring members comprise at least a pair of force sensors and a first body connecting the at least a pair of force sensors to the measuring surface. In a preferred embodiment, the at least a pair of force sensors are disposed to provide counter-directed readings when the measuring surface is influenced by a stress force.

In accordance with one embodiment of the apparatus of the present invention, the stress measuring members are disposed to measure the perpendicular force exerted by both steam pressure at the measuring surface and the fiber pressure exerted by the refining material.

In accordance with another embodiment of the apparatus of the present invention, the stress measuring members are disposed to measure the perpendicular force exerted only by the fiber pressure exerted by the refining material and including means for compensating for the steam pressure at the measuring surface. Preferably, the means for compensating comprises temperature measuring means for measuring the temperature of the steam at the measuring surface whereby the steam pressure at the measuring surface can be calculated therefrom.

In accordance with one embodiment of the apparatus of the present invention, the apparatus includes pressure equalizing means for influencing the stress measuring means from both the direction of the measuring surface and the opposite direction.

In accordance with another embodiment of the apparatus of the present invention, the stress measuring means comprises at least two plate-shaped force sensors. In a preferred embodiment, the at least a pair of force sensors comprises strain gauges, or in another embodiment piezo-electric transducers.

In accordance with the method of the invention, the measuring is performed over a measuring surface that constitutes a part of a refining disc, the measuring surface comprising at least parts of more than one bar and being resiliently arranged in the surface of the refining disc and forces directed perpendicularly to the measuring surface are measured. The measuring device in accordance with the present invention comprises members for measuring the stress force over the measuring surface, these members in turn comprising means for measuring forces directed perpendicularly to the measuring surface.

By measuring not only forces parallel to the refining disc, as already known, but also measuring forces perpendicular to the refining disc, more complete information is obtained about how the refining process functions. A fiber mat of the refining material is formed between the refining discs and, with the aid of the present invention, an indication can be obtained as to how hard the pressure from the fiber mat is and how hard the fiber mat is being compressed. This improves the potential for achieving optimum control of the whole refining process.

The measurement in accordance with the method of the present invention is preferably characterized in that the measurement of forces directed perpendicularly to the measuring surface comprises measuring the normal force exerted by a combined pressure consisting of the steam pressure existing at the measuring surface and the fiber pressure exerted by the refining material. According to a variation the measurement of forces directed perpendicularly to the measuring surface comprises measuring the normal force exerted by only the fiber pressure of the refining material, since compensation is made for the steam pressure existing at the measuring surface.

The steam pressure compensation can be performed by measuring the temperature of the steam at the measuring surface, and the steam pressure at the measuring surface being calculated on the basis of this temperature, compensation thus being obtained for the steam pressure so that the normal force exerted by only the fiber pressure of the refining material is measured. Alternatively the steam pressure compensation can be achieved by measurement of the normal force being performed with the aid of force sensors arranged in connection with the measuring surface and the steam pressure being permitted to influence the sensors from two directions, both at the measuring surface in the refiner and also from the opposite direction, compensation for the steam pressure thus being obtained so that only the normal force exerted by the fiber pressure on the refining material is measured.

In accordance with a preferred embodiment of the device of the present invention the measuring surface is movably arranged at right angles to the measuring surface, and the members for measuring forces directed perpendicularly to the measuring surface comprise at least two force sensors connected to the measuring surface by means of a body. These force sensors are preferably arranged so that they give counter-directed readings or deflection when the measuring surface is influenced by the stress force. The advantage is thus gained that any temperature fluctuations occurring are not permitted to influence the result. The use of pairs of counter-directed sensors also offers the advantage that any measuring errors are halved for each direction.

In accordance with a particularly advantageous embodiment the force sensors comprises strain gauges. A particular advantage with this is that the actual measuring device will be relatively small and low and can then be fitted directly in the refining segment.

BRIEF DESCRIPTION OF THE DRAWINGS

The present invention will now be described with reference to the following detailed description, which in turn refers to the accompanying drawings, in which.

DETAILED DESCRIPTION

Figure 1:
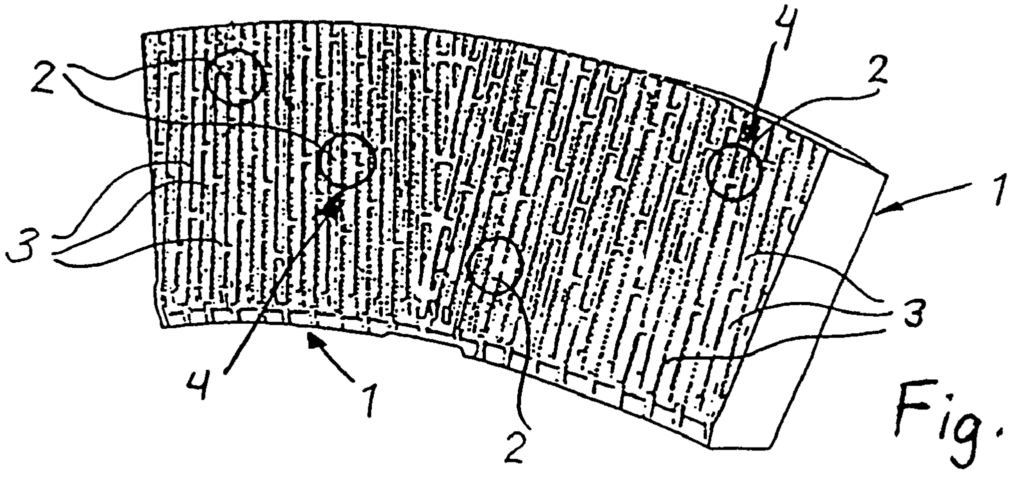
FIG. 1 is a top, perspective view of a refining segment included in a refining disc, which segment is provided with measuring devices in accordance with the present invention.

Referring to the drawings, FIG. 1 shows a part of a refining disc in the form of a refining segment 1, provided with a pattern comprising a number of bars 3 extending substantially in the radial direction. Measuring devices 4 in accordance with the present invention are also drawn schematically in this figure. These measuring devices preferably have a circular measuring surface 2 with a diameter in the order of 30 mm, for example, but the measuring surface may alternatively have any other geometric shape that is found suitable. The measuring devices are preferably arranged at different radial distances from the center of the refining disc, and segments at different distances from the center preferably also have measuring devices. The measuring devices can also advantageously be displaced peripherally in relation to each other, to improve the determining of the power distribution in the refiner and thus better control the refining process. When a measuring device is influenced by forces, each of the force sensors will generate a signal that is proportional to the load.

Figure 2:
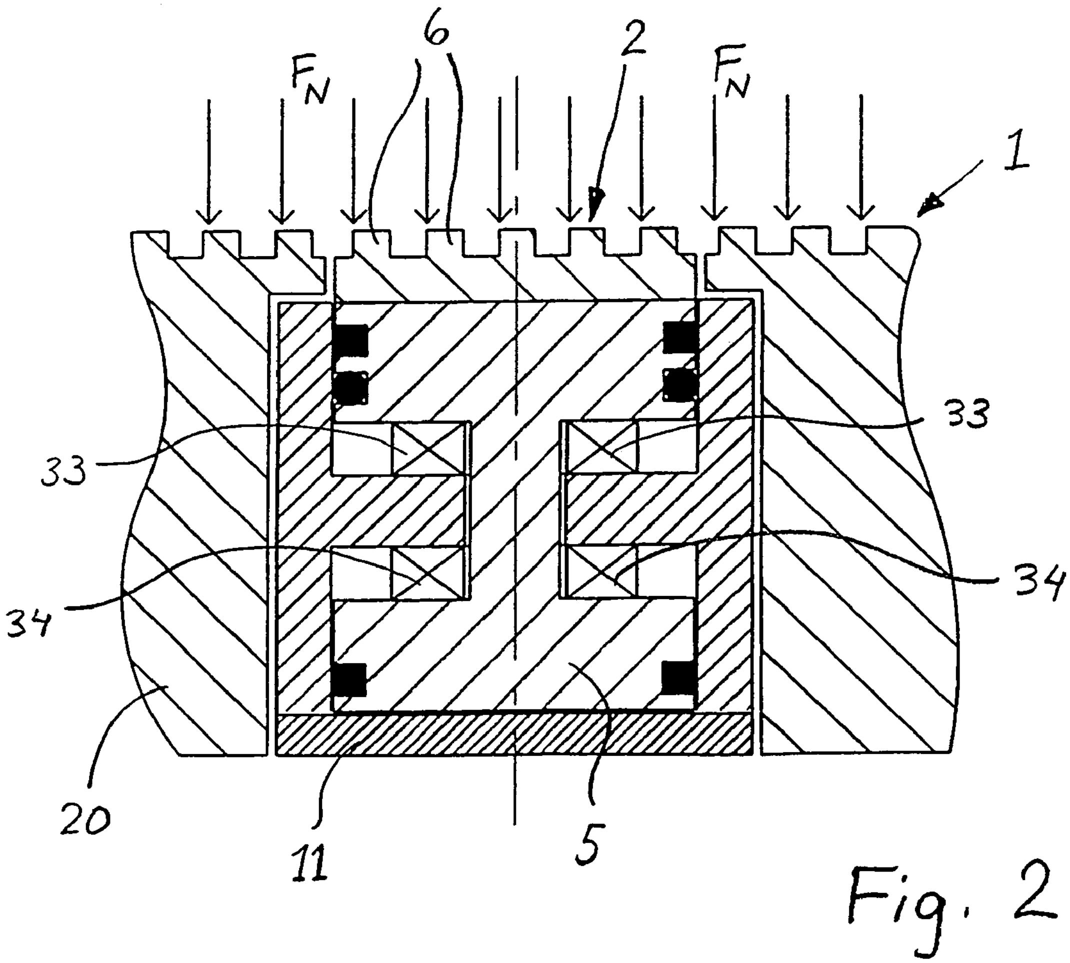
FIG. 2 is a side, elevational, cross-sectional schematic view of a first embodiment of a measuring device in accordance with the present invention.

The schematic measuring device 4 in accordance with the first embodiment in FIG. 2 comprises a measuring surface 2 provided with bars 6, or parts of bars, this measuring surface constituting a part of a refining segment as illustrated in FIG. 1. As is also clear from FIG. 1, the measuring device preferably has a circular measuring surface. The measuring device and measuring surface are arranged movably in the refining segment 1, at least resiliently supported in a direction perpendicular to the measuring surface. They may also be movably arranged in directions substantially parallel with the measuring surface. This can be achieved in various ways not shown here, but reference is made by way of example to Swedish patent application No. 0201023-9.

The measuring surface 2 abuts directly against a body 5 extending inside the device. This body 5 connects the measuring surface 2 with members in the form of force sensors or transducers, 33 and 34, for measuring forces acting perpendicularly on the measuring surface 2, i.e. normal forces $F_N$. The normal force is a resultant of the steam pressure at the measuring surface in the refiner, i.e. the pressure $F_{St}$ exerted by the steam on the measuring surface, and the pressure $F_{Fib}$ exerted on the measuring surface (and the refining segment) by the fiber mat formed by the refining material. The force sensors 33 and 34, respectively, are arranged in pairs opposite each other in the normal direction so that the force sensors in a pair will give counter-directed readings when influenced by a force. When the normal force on the surface 2 increases, therefore, the load on one of the sensors will increase while at the same time the load on the other sensor in the pair will decrease. The stress force can therefore be calculated on the basis of the difference between the readings or the deflection measured at any one time on respective force sensors in a pair. This enables compensation to be obtained, for instance, for any temperature fluctuations that may affect the readings. It would naturally be possible to arrange the sensors differently in relation to each other and still have their respective readings be counter-directed.

Figure 4:
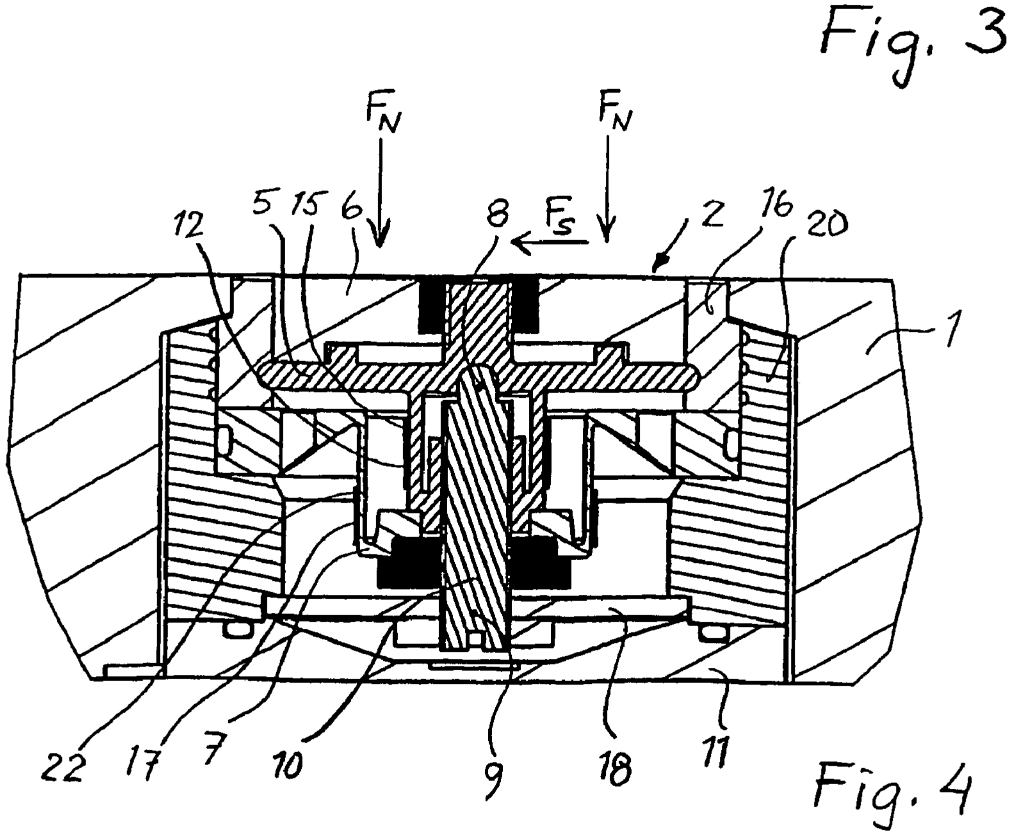
FIG. 4 is a side, elevational, cross-sectional view of a combined measuring device for normal forces and shearing forces in accordance with the present invention.
Figure 5:
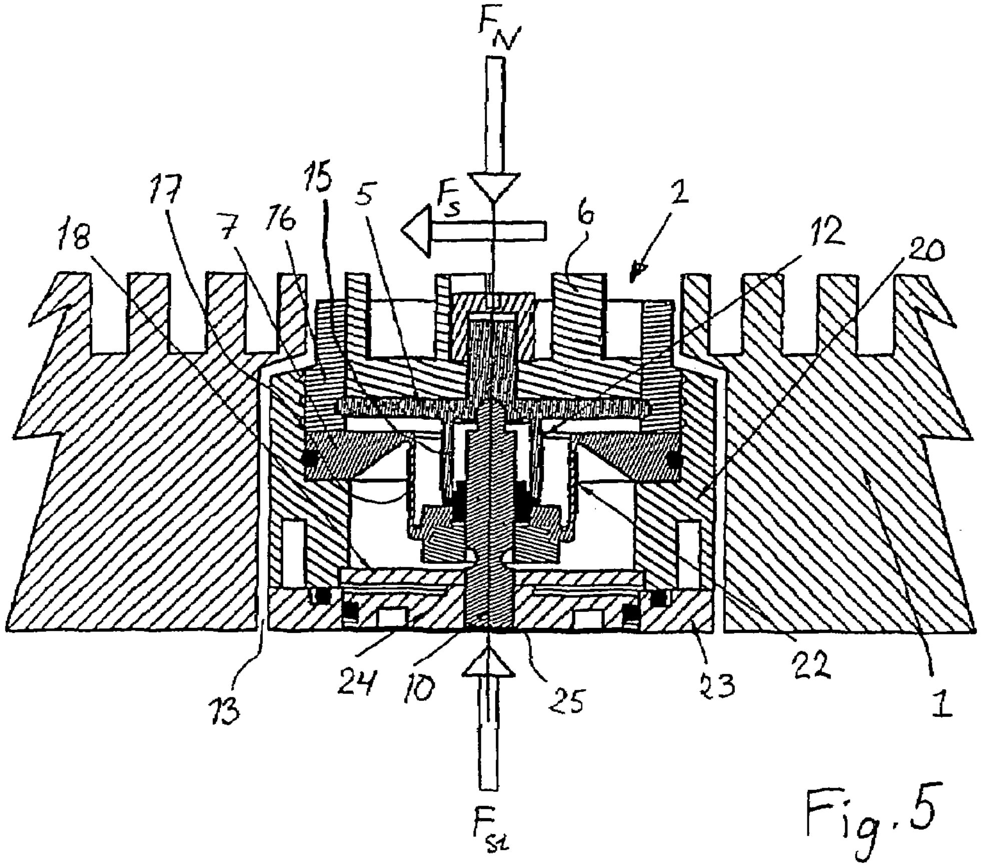
FIG. 5 is a side, elevational, cross-sectional view of a combined measuring device for normal forces and shearing forces, with steam compensation in accordance with the present invention.

In the example illustrated the force sensors 33 and 34, respectively, are designed as plates centered around the central axis of the measuring device. There are piezoelectric transducers, for example, that are plate shaped, as well as plates provided with strain gauges. However, other types of sensors are possible. Arrangements other than plate-shaped are also possible. In the case of strain gauges, for instance, a number of these may in principle be arranged directly on the body 5, distributed uniformly around the central axis. See also FIG. 4 and FIG. 5, illustrating examples of how a variant with strain gauges might look.

It should also be mentioned that in practice the body 5 must be suitable for the plates to be put in place. This may be achieved by the body 5 being divided and then assembled after the plates have been fitted, using some type of assembly tool.

The internal parts of the measuring device described above, the body 5 and sensors, 33 and 34, are arranged in a protective sensor housing 20. This housing has an opening at the top, which is adjacent to the surrounding refining segments and which is closed off from the refining material by the measuring surface 2. In the first embodiment under consideration the housing is also closed at the bottom, towards the stator of the refiner or segment holder if such is used, by a lid 11.

Figure 3:
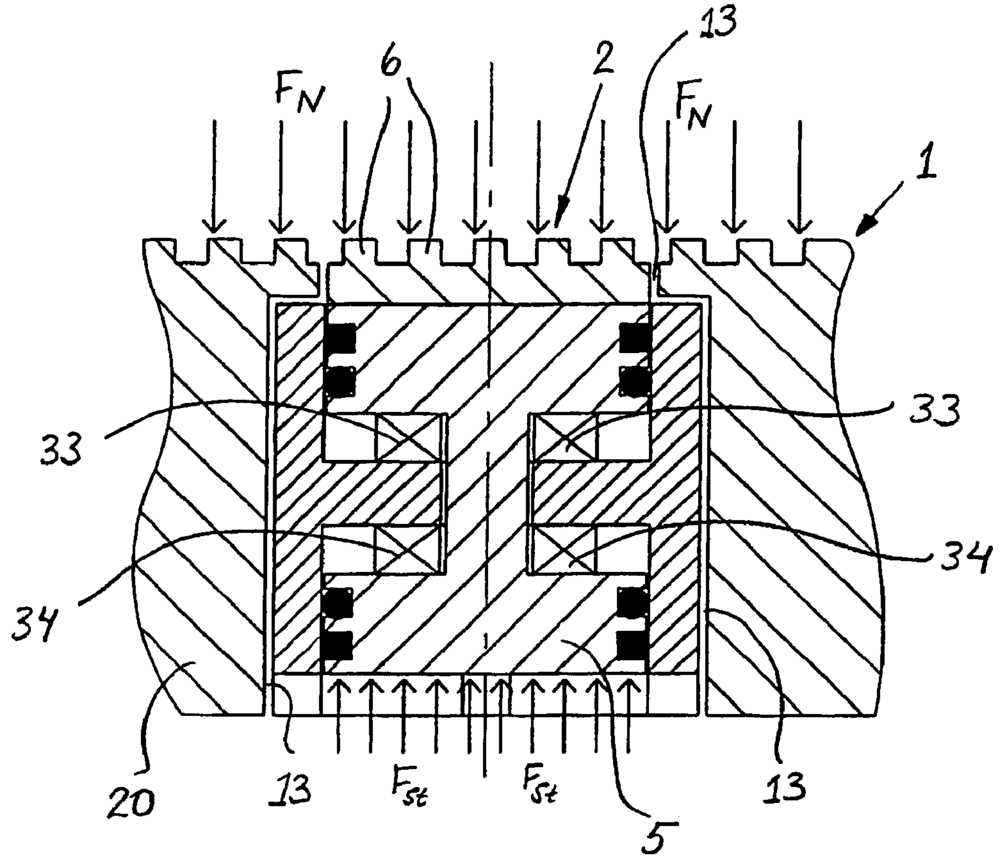
FIG. 3 is a side, elevational, cross-sectional schematic view of a second embodiment of a measuring device in accordance with the present invention.

The second embodiment, illustrated schematically in FIG. 3, shows how a measuring device can be designed with compensation for the steam pressure $F_{St}$. In this arrangement, thus only the pressure of the actual fiber mat, $F_{Fib}$ is measured. We have here a measuring device equivalent to that in FIG. 2 where the internal parts comprising the body 5 and force sensors, 33 and 34, are arranged in a sensor housing 20. Contrary to the embodiment in FIG. 3, however, the lid closing the sensor housing off from the stator or segment holder is omitted so that a connection exists between the upper side of the measuring surface 2 and the upper side of the surrounding refining segment 1 by means of an open channel 13 arranged between the side walls of the sensor housing 20 and the surrounding refining segment 1. Steam from the area at the measuring surface can be transported through this channel so that the steam pressure existing at the measuring surface also influences those parts of the measuring device that measure the perpendicular pressure in the opposite direction to the normal pressure, i.e. from below, having the same area as the measuring surface. The steam force acting on the measuring surface and the steam pressure acting from below thus cancel each other out and a measurement of the actual fiber pressure can be obtained. The measurement of the normal force influencing the measuring surface 2 is thus reduced by the existing steam pressure, thereby indicating the fiber pressure directly.

Finally, a third embodiment of the present invention is feasible. It is namely possible to also provide the device in accordance with the first embodiment, illustrated in FIG. 2, with members for compensating the steam pressure. This can be achieved by installing at least one temperature sensor in conjunction with the measuring surface, to measure the temperature of the steam. Knowledge of the temperature of the steam enables the pressure of the steam $F_{St}$ to be calculated. A calculation of the pressure from the actual fiber mat, $F_{Fib}$ can then be made by reducing the normal force $F_N$ by the calculated steam pressure $F_{St}$.

Figure 6:
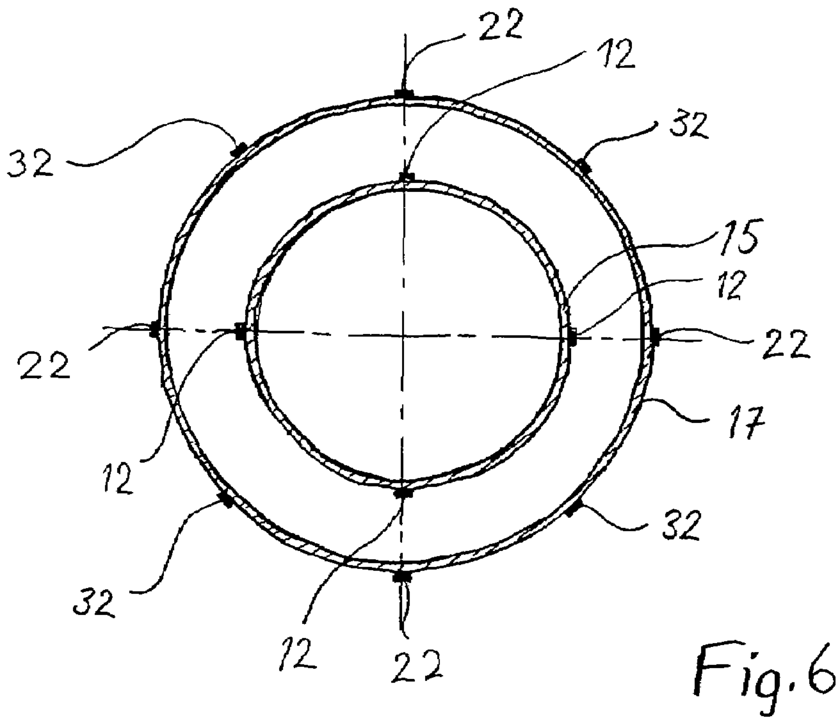
FIG. 6 is a top, elevational, cross-sectional view of a detail of the devices shown in FIGS. 4 and 5.

FIGS. 4 and 5 show examples of how a device for measuring normal forces in a practical application can be combined with measuring shearing forces $F_S$, i.e. forces parallel to the plane of the measuring surfaces 2. FIG. 6 shows a schematic cross section of a component in the devices in FIGS. 4 and 5, in the form of the thin-walled tubular parts of the first and second bodies and the strain gauges arranged thereon.

As before, the measuring device 4 in FIG. 4 and that in FIG. 5 comprises a measuring surface 2 provided with bars 6, or parts of bars, which measuring surface constitutes a part of a refining segment as illustrated in FIG. 1. The measuring device preferably has a circular measuring surface. The measuring device and the measuring surface are movably arranged in the refining segment 1, in all directions.

The measuring surface 2 is in direct contact with a first, upper body 5 extending inside the device. At its lower side this first body is shaped as a thin-walled tube 15. The material is chosen to be somewhat resilient. A cross section through the thin-walled tube section can therefore be likened to a spring. Strain gauges are arranged on the outside of the thin-walled tube section, which form a first set of force sensors 12. It is actually the thin-walled, somewhat resilient tube section that, together with the strain gauges, form the force sensors, but for the sake of simplicity the term force sensor is used in this description primarily as a designation for the strain gauges or equivalent members. The strain gauges are preferably arranged axially and when the thin-walled tube is subjected to a load it is slightly deformed so that it influences the strain gauges. These are in turn connected to some suitable strain gauge bridge that generates a corresponding signal. The thin-walled tube section 15 is pre-stressed with a tensile force so that it does not risk collapsing when subjected to loading.

Inside the pipe section extends a rod 10 with a spherical top, which rod forms the previously mentioned attachment element with the aid of which the various parts of the device are secured and which also connects the various parts in the measuring device with each other and with the measuring surface 2. The first body 5 is journalled on the spherical top which thus functions as a fulcrum for the body 5 and forms a first fulcrum 8. This embodiment comprises four sensors arranged symmetrically in relation to a center line extending through the measuring surface 2 and through the rod 10. The sensors 12 are preferably arranged spaced with 90° spacing (see also FIG. 6). They are arranged in pairs opposite each other so that the sensors in a pair will give counter-directed readings when influenced by a force. These pairs of sensors are also arranged perpendicular to each other for measuring in an X-direction and a Y-direction, i.e. in a plane parallel with the measuring surface 2. This permits measurement of forces in all directions in a plane parallel with the measuring surface, the magnitude and direction of the force being determined as the resultant of the readings of respective pairs of force sensors.

A second, lower body 7 is arranged below the first, upper body 5 and outside its tubular part 15. This second body also has a thin-walled tubular part 17, arranged outside and concentric with the tubular part 15 of the first body 5 and with the rod 10, and functioning in corresponding manner, i.e. as a spring. Strain gauges are also arranged on the outside of the second thin-walled tubular part 17. These strain gauges form a second set of force sensors 22 and are preferably arranged axially. They are four in number and are arranged symmetrically in relation to a center line extending through the measuring surface 2 and through the rod 10. In other respects they are arranged in the same way and function in the same way as the sensors 12 of the upper body 5, i.e. they are arranged in pairs and measure forces in X- and Y-direction (see also FIG. 6). However, in the example illustrated the fulcrum 9 for the lower body 7 is formed by the central point of a resilient plate or sheet 18 arranged below the body 7 and connected to the rod 10 so that the rod extends through the center of the plate.

The measurement of normal forces in the device illustrated in FIG. 4 is performed with the aid of additional force sensors 32, forming strain gauges for the purpose, arranged on one or other of the tubular parts, 15 or 17, preferably axially between the already existing sensors, as illustrated schematically in FIG. 6. To obtain a fairly correct measurement at least three force sensors should be used for measuring the normal force, and these should be uniformly distributed. However, the use of four sensors is preferred, as shown in FIG. 6, possibly more.

As described earlier, the internal parts of the measuring device in FIG. 4 are arranged in a protective sensor housing 20. This housing is provided with an opening at the top, and is adjacent to the surrounding refining segments, which is closed off from the refining material by the measuring surface 2 and a resilient seal 16 between the measuring surface and the side walls of the sensor housing. The housing is also closed off at the bottom, towards the stator of the refiner or segment holder if such is used, by a lid 11.

FIG. 5 illustrates a variant equivalent to FIG. 4 in which compensation can also take place for the steam pressure existing at the measuring surface which constitutes a part of the normal pressure on the measuring surface that is measured with the measuring device in accordance with the first embodiment. Here also the internal parts are situated in a protective sensor housing 20. Contrary to the embodiment in FIG. 4, however, the lid closing off the sensor housing from the stator or segment holder is designed so that a connection exists between the upper side of the measuring surface and the upper side of the surrounding refining segment, by means of an open channel 13 arranged between the side walls of the sensor housing 20 and the surrounding refining segment 1. The aim is that compensation should be possible to be achieved for the existing steam pressure when the normal force affecting the measuring surface 2 is calculated. For this purpose the existing steam pressure shall also affect the parts of the measuring device that measure the perpendicular pressure in the direction opposite to the normal pressure, i.e. from below. The lid 11 may thus be made in two parts, an outer part 23 provided with channels and an inner, movable part 24 having a gap between it and the stator/segment holder. The rod 10 is also shaped so that a gap exists between it and the stator/segment holder. Steam can thus penetrate to the gap 25 formed above the stator/segment holder and influence the inner part 24, rod 10 and force sensors 32 on the part 17, or possibly other members that have been mentioned, and can form the means for measuring perpendicular forces. The steam pressure acting on the measuring surface and the steam pressure acting from below thus cancel each other out and a measurement of the actual fibre pressure can be obtained.

In all embodiments equipment is also provided for processing the signals emitted by the various sensors so that the control of the refining process aimed at can be obtained. Such equipment is commercially available and can easily be adapted by one skilled in the art.

It should also be mentioned that the present invention can naturally be used together with various other devices for measuring shearing forces in refiners.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of measuring stress forces in refiners including a pair of refining discs juxtaposed with each other and forming a refining gap for refining material therebetween, said pair of refining discs including at least one refining surface including a plurality of bars for refining said material within said refining gap, said at least one refining surface including a measuring surface comprising a predetermined portion of said at least one refining surface including at least a portion of at least a pair of said plurality of bars, said method comprising resiliently mounting said measuring surface in said at least one refining surface and measuring said stress forces directed perpendicular to said measuring surface.

2. The method of claim 1 wherein said measuring comprises measuring both said perpendicular forces comprising the force exerted by steam pressure at said measuring surface and the force exerted by fiber pressure from said refining material.

3. The method of claim 1 wherein said measuring comprises measuring only said force exerted perpendicular to said measuring surface by fiber pressure from said refining material and compensating for the force exerted by steam pressure at said measuring surface.

4. The method of claim 3 wherein said compensating for said force exerted by steam pressure at said measuring surface comprises measuring the temperature of said steam at said measuring surface and calculating the force exerted by said steam pressure at said measuring surface based on said measured steam temperature.

5. The method of claim 3 wherein said measuring comprises disposing force sensors in connection with said measuring surface and permitting said steam pressure to influence said force sensors in both the direction of said measuring surface and the opposite direction to thereby compensate for said steam pressure.

6. Apparatus for measuring stress forces in refiners including a pair of refining discs juxtaposed with each other and forming a refining gap for refining material therebetween, said pair of refining discs including at least one refining surface including a plurality of bars for refining said material within said refining gap, stress measuring means for measuring the stress force over a measuring surface comprising a predetermined portion of said at least one refining surface comprising at least a portion of at least a pair of said plurality of bars, said stress measuring means being resiliently mounted in said at least one refining surface, and including stress measuring members measuring said forces directed perpendicular to said measuring surface.

7. The apparatus of claim 6 wherein said stress measuring means is removably disposed in said at least one refining surface perpendicular to said measuring surface and said stress measuring members comprise at least a pair of force sensors and a first body connecting said at least a pair of force sensors to said measuring surface.

8. The apparatus of claim 7 wherein said at least a pair of force sensors are disposed to provide counter-directed readings when said measuring surface is influenced by a stress force.

9. The apparatus of claim 6 wherein said stress measuring members are disposed to measure the perpendicular force exerted by both steam pressure at said measuring surface and the fiber pressure exerted by said refining materials.

10. The apparatus of claim 6 wherein said stress measuring members are disposed to measure the perpendicular force exerted only by said fiber pressure exerted by said refining material and including means for compensating for the steam pressure at said measuring surface.

11. The apparatus of claim 10 wherein said means for compensating comprises temperature measuring means for measuring the temperature of said steam at said measuring surface whereby the steam pressure at said measuring surface can be calculated therefrom.

12. The apparatus of claim 10 including pressure equalizing means for influencing said stress measuring means from both the direction of said measuring surface and the opposite direction.

13. The apparatus of claim 6 wherein said stress measuring means comprises at least two plate-shaped force sensors.

14. The apparatus of claim 7 wherein said at least a pair of force sensors comprises strain gauges.

15. The apparatus of claim 7 wherein said at least a pair of force sensors comprises piezo-electric transducers.

* * * * *